United States Patent [19]

Doyle et al.

[11] Patent Number: 4,857,694

[45] Date of Patent: Aug. 15, 1989

[54] METHOD AND APPARATUS FOR AUTOMATIC VAPOR COOLING WHEN SHAPE MELTING A COMPONENT

[75] Inventors: Thomas E. Doyle, Louisville; Patrick M. Ryan, Alliance, both of Ohio

[73] Assignee: The Babcock & Wilcox Company, New Orleans, La.

[21] Appl. No.: 190,791

[22] Filed: May 6, 1988

[51] Int. Cl.⁴ .............................................. B23K 9/04
[52] U.S. Cl. .............................. 219/76.12; 219/76.14; 228/222
[58] Field of Search .................. 219/76.1, 76.12, 76.14; 228/222

[56] References Cited

U.S. PATENT DOCUMENTS

| | | | |
|---|---|---|---|
| 3,611,541 | 10/1971 | Garrett | 219/76.14 |
| 3,665,143 | 5/1972 | Ujiie | 219/76 |
| 3,696,228 | 10/1972 | Thomas, Jr. et al. | 219/76 |
| 3,914,851 | 10/1975 | Ujiie | 29/412 |
| 3,948,428 | 4/1976 | Bonomo et al. | 228/46 |
| 3,985,995 | 10/1976 | Brandi et al. | 219/76 |
| 4,353,689 | 10/1982 | Fernandez et al. | 432/225 |
| 4,517,434 | 5/1985 | Million et al. | 219/76.14 |
| 4,621,762 | 11/1986 | Bronowski | 228/215 |
| 4,660,756 | 4/1987 | Geisseler | 219/76.1 |
| 4,671,448 | 6/1987 | Million et al. | 219/76.12 |

FOREIGN PATENT DOCUMENTS

| | | |
|---|---|---|
| 2942868 | 2/1981 | Fed. Rep. of Germany . |
| 2061156 | 5/1981 | United Kingdom . |
| 2160809 | 1/1986 | United Kingdom . |

OTHER PUBLICATIONS

"High Quality Large Components 'Shape Welded' by a SAW Process", Kussmaul, K., Schoch, F. W., and Luckow, H., *Welding Journal*, Sep. 1983, pp. 17–24.

"Shape Welding the Current Stage of the Art in the Federal Republic of Germany," Gnirss, G. 5/2/86.

"The Production of Shape-Welded Components of Various Geometrical Shapes," Becker, R. et al., Feb. 1985.

*Primary Examiner*—Clifford C. Shaw
*Attorney, Agent, or Firm*—Vytas R. Matas; Robert J. Edwards; Daniel S. Kalka

[57] ABSTRACT

A method and apparatus for automatically cooling a workpiece being manufactured by shape melting whereby a gas/liquid coolant mixture is pumped onto the external surface of the part to be cooled. Temperature and pressure data is fed to a computer control system which regulates the flow of the gas and liquid coolant mixtures. A suction device which enshrouds the spray head extracts the heated and vaporized fluid from the vicinity of the surface. The apparatus may be provided with multiple spray heads which comprise the cooling head and have the ability to control the total rate at which coolant flows through the device by individually controlling coolant and gas flow through each of the multiple spray heads. If more cooling is desired, the computer control system activates more nozzles for flow, or it increases flow rate through already activated nozzles. Both the number of spraying heads and flow rates through each spray head are variable, so the cooling capabilities of the system are continuously variable over a wide range of total flow rates through the device.

8 Claims, 3 Drawing Sheets

METHOD AND APPARATUS FOR AUTOMATIC VAPOR COOLING WHEN SHAPE MELTING A COMPONENT

BACKGROUND OF THE INVENTION

1. Field of the Invention

The present invention relates in general to the cooling process during shape melting, and, in particular, to an automatically controlled cooling device designed to cool the workpiece during the shape melting process at an optimum cooling rate and to maintain an optimum interpass temperature.

2. Description of the Related Art

As used herein, the term shape melting is used to refer to a welding process whereby structural components are manufactured entirely from weld material deposited layer-upon-layer onto a surface or an initial preform until the desired geometry is achieved. This process offers the advantage of delivering a near net shape component that can be produced quickly and economically using either ferrous or non-ferrous materials.

A significant amount of heat is generated during the shape melting process. The source of this heat is a welding arc which is used to melt and deposit material. The heat input for shape melting might range from 10 kilojoules per inch to as high as 400 kilojoules per inch (for some high deposition rate processes). Even at the low end of the heat input range, if no means of extracting heat is provided, the heat input of the shape melting process will cause the average temperature of the workpiece to continuously rise. It is necessary to maintain a maximum average workpiece temperature in order to control the properties of the final product. The average temperature also impacts the amount of distortion in the product, the bead shape, the degree of oxidation, and perhaps the weldability of the deposited material. For these reasons it is desirable to maintain some maximum average "interpass" temperature.

Similar considerations (mechanical properties, weldability, distortion, etc.) also dictate that maintaining a maximum interpass temperature and an optimum cooling rate is prudent. So, to successfully manufacture a shaped melted component, a high degree of temperature control is necessary.

Various investigators have developed methods and apparatus related to the shape melting process, with particular emphasis on the cooling process. U.S. Pat. No. 3,985,995 to Brandi, deceased et al discloses a cooling process using sprays of water or jets of air for pre- and post-cooling around the weld metal deposition to locally cool the work piece. Likewise, U.S. Pat. No. 3,948,428 teaches of a device using water and gas wherein the cooling water is brought into contact with a hot weld and wherein the generated steam and non-evaporated water are immediately removed from the weld. U.S. Pat. No. 4,517,434 teaches the use of cooling with carbon dioxide by admixing it in the solid state with the welding powder.

German Patent Disclosure No. 2,942,868 discloses a device for locally cooling a welding zone in front of and/or behind the particular weld point by means of liquid and/or gaseous media. The device consists of at least one unit with a nozzle directed towards the workpiece for spreading a cooling fluid, and placed in a directing funnel with a hood surrounding the directing funnel connected to a vacuum device. Vapors created by the cooling process are immediately aspirated. Several units can be used to increase the cooling performance, and have a means for operating in an excess of a 90° angle. UK Patent Application No. GB 2,061,156A modifies this cooling approach with the addition of an exhaust duct to indirectly remove cooling vapor and radiant heat.

The time at which the coolant is removed is another approach taken in UK Patent Application No. GB 2,160,809A by removing the water-air mixture before the formation of steam.

Other approaches to cooling the workpiece involved techniques for rebuilding tractor-roller assemblies such as U.S. Pat. Nos. 4,230,928; 3,514,568; 3,596,041; 3,895,209; and 4,233,487.

Still other attempts at cooling the workpiece for shape melted components include: employment of a water cooled dam, U.S. Pat. No. 3,696,228; an outer jacket forming a coolant chamber, U.S. Pat.No. 2,912,562; U.S. Pat. Nos. 3,071,678 and 3,179,783; a water cooled welding torch, or some modification thereto such as U.S. Pat. No. 4,140,892; and cooling of the workpiece holder like in U.S. Pat. Nos. 3,777,106 and 3,953,704.

Many of the features of the prior art are also described in a literature article on shape welding, "High Quality Large Components 'Shape Welded' By A SAW Process", Kussmaul, K., Schoch, F. W., and Luckow, H., *Welding Journal*, September, 1983.

Evaluation of the above-mentioned references reveal many attempts to address the need for a device to cool at a desired rate or to within a given temperature range, however, in every instance no indication is given as to how the device is precisely and accurately controlled to achieve the desired cooling response.

There is a need for a device which has the ability to sense the temperature of the workpiece, and to adjust the total coolant flow rate through the device for optimum cooling. The prior art shows the need for an apparatus that when the temperature of the workpiece varies upwards at different rates during manufacture, it will cool at different rates maintaining a constantly acceptable interpass temperature.

SUMMARY OF THE INVENTION

The present invention solves the aforementioned problems in the prior art by providing a computer controlled cooling device designed to cool the workpiece at an optimum cooling rate and to maintain an optimum interpass temperature. The present invention is provided with an automated feedback device which controls the cooling device operation that aids in achieving optimum cooling.

The present invention resides in a device whereby a gas/liquid coolant mixture is pumped through at least one spray head onto the external surface of the part to be cooled. Cooling of the surface comes about primarily by heat conducted to, and absorbed by, the coolant mixture during vaporization of the coolant fluid. After an increment of cooling has been accomplished, the heated and vaporized fluids are extracted from the vicinity of the surface by means of a suction device. The temperature of the workpiece is sensed and fed to the computer control system. Using predetermined algorithms, the control system takes the temperature input data and generates output control signals. These signals control the total rate at which coolant flows through the device by individually controlling coolant flow through each of the spraying nozzles or heads which comprise the cooling head. As an example, if more cooling is desired, the control system activates more nozzles for flow, or it increases the flow rate through already activated nozzles. Both the number of the spraying nozzles and flow rate through each nozzle are variable so the cooling capabilities of the system are continuously variable over the wide range of total flow rates through the device.

Accordingly, one aspect of the present invention is to provide accurate sensing and control of the temperature of a shape melted component.

Another aspect of the present invention is to provide continuous and automatic control of the cooling without subjecting the weld deposit to excessive moisture or other deleterious conditions.

Still another aspect of the present invention is drawn to optimizing the quality of the shape melted component with respect to distortion, lack of defects, and mechanical properties.

Yet a further aspect of the present invention is drawn to the ability to deliver the final product with tailored mechanical, corrosion, and physical properties. This "tailoring" ability comes about because these properties are strongly tied to a number of interrelated and controllable manufacturing parameters such as: weld heat input, interpass temperature, cooling rate, bead size, bead sequence, and bead position. If, in addition to the above variables, one also permits controlled composition variation throughout the product; it is possible if appropriate control is exercised for the product to have the desired combination of strength, toughness, hardness or corrosion resistance at critical points in the product, i.e., where they are most needed. The viability of the tailored-product concept hinges on precise control of temperature.

The various features of novelty characterized in the invention are pointed out with particularity in the claims annexed to and forming a part of this disclosure. For a better understanding of the invention, and the operating advantages obtained by its use, reference is made to the accompanying drawings and descriptive matter in which a preferred embodiment of the invention is illustrated.

DESCRIPTION OF THE PREFERRED EMBODIMENTS

Figure 1:
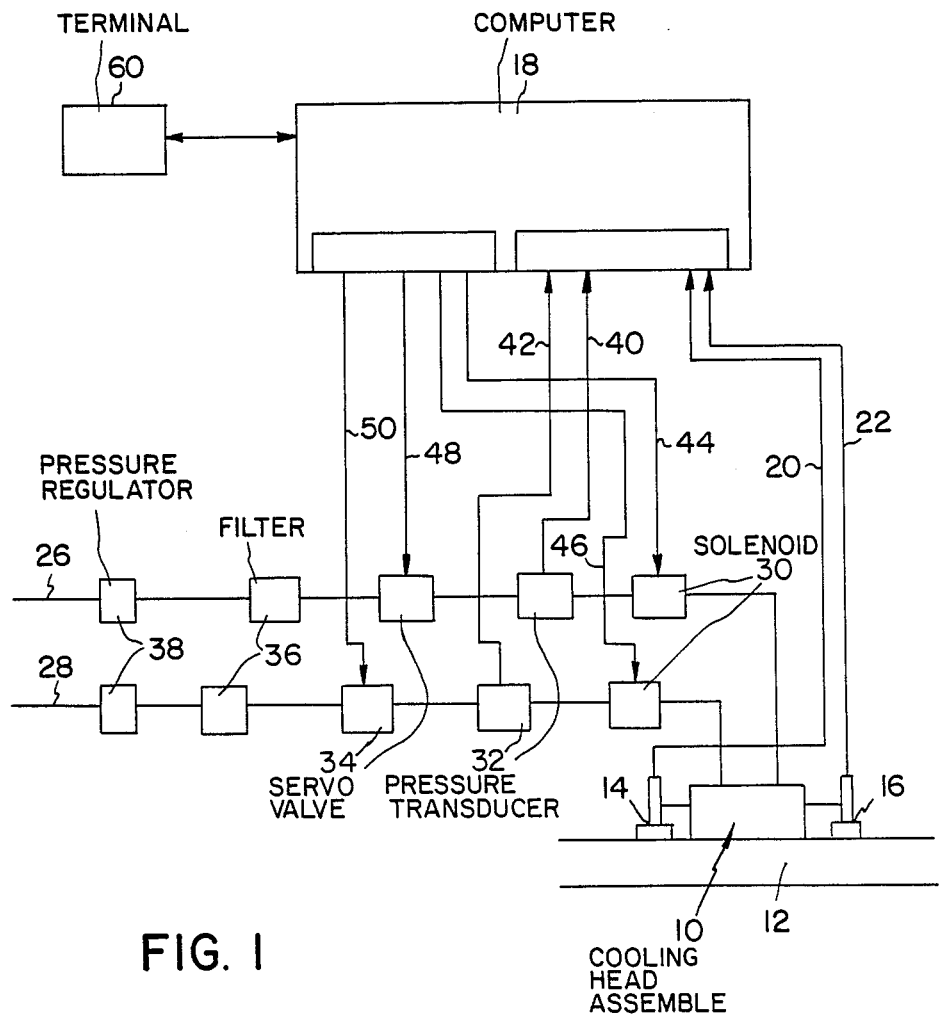
FIG. 1 is a schematic representation of one embodiment of the present invention in place on a shape melted workpiece.

Referring to the Figures generally, wherein like numerals designate the same element throughout the several drawings, and to first FIG. 1 in particular, there is shown an apparatus for automatically cooling a workpiece being manufactured by shape melting. The cooling head assembly generally designated as 10 is in place on top of a workpiece 12. Attached to the cooling head assembly 10 are two temperature sensors 14, 16 respectively. Suitable temperature sensors include sliding contact thermocouples or other means for temperature sensing like infrared (IR) thermometers. The temperature is fed to a computer control 18, which may be equipped with terminal 60, via input lines 20 and 22 which are connected to the temperature sensors 14, 16 respectively.

Figure 2:
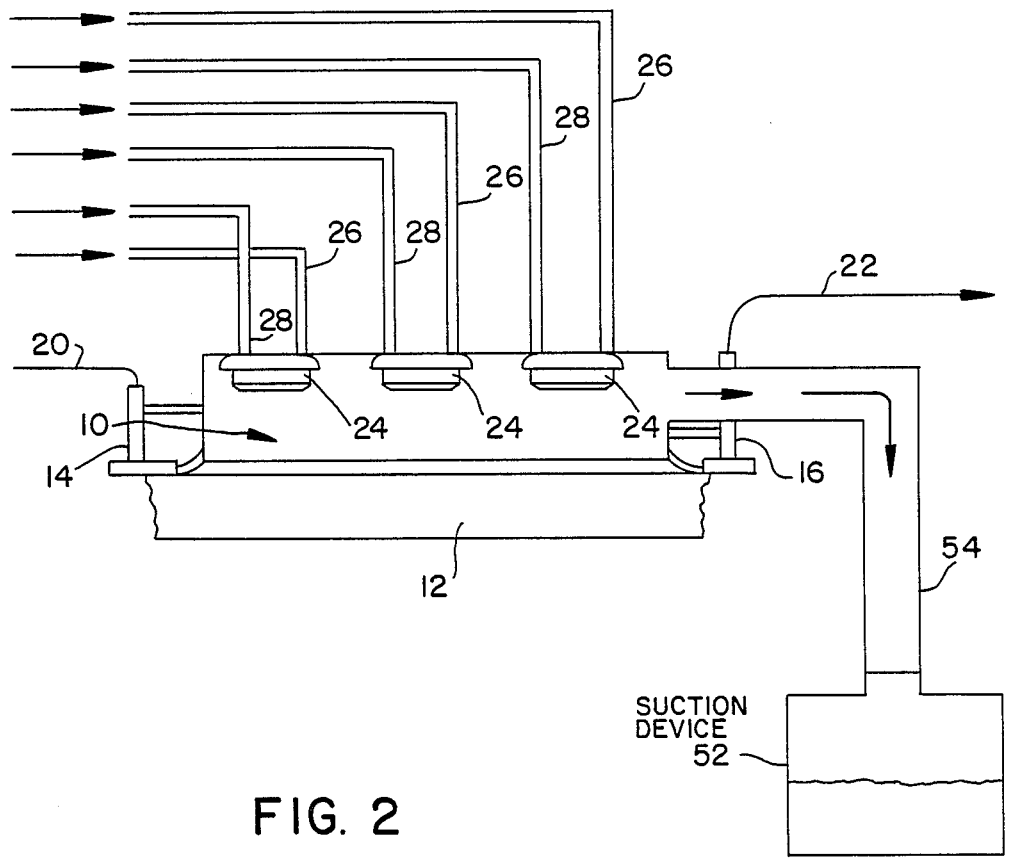
FIG. 2 is a cross-sectional schematic illustration of an embodiment of a cooling head of the present invention in place on a shape melted workpiece.

Referring to FIG. 2, there is shown a cross-sectional view of an embodiment of the cooling head assembly 10, having a plurality of spray heads or nozzles 24. These nozzles 24 are directed towards the workpiece 12. Attached to each spray head 24 is a coolant supply duct 26 and a gas supply duct 28. Referring back to FIG. 1, each coolant and gas supply duct, 26, 28 respectively, is provided with a solenoid 30, a pressure transducer 32, and a servo valve 34. The main coolant supply line 26 and the main gas supply line 28 may further be provided with a filter 36 and a manual pressure regulator 38.

Pressure data from the coolant supply duct 26 and the gas supply duct 28 are transmitted from the pressure transducers 32 to the computer control system 18 by input lines 40, 42 respectively, for the coolant and gas supply ducts 26, 28. Using predetermined algorithms, the computer control system 18 takes the temperature input data and the pressure input data to generate output control signals.

The output control signals from computer control system 18 are sent to the solenoids 30 through the control 44 for the coolant supply duct 26 and through control line 46 for the gas supply duct 28. The output control signals are also sent to the servo valves 34 through control line 48 for the coolant supply duct 26 and through control line 50 for the gas supply duct 28. These signals control the total rate at which coolant and gas flow through the device by individually controlling coolant and gas flow through each of the spray nozzles or spray heads 24 which comprise the cooling head assembly 10.

As an example, if more cooling is desired, the computer control system 18 activates more spray heads 24 or flow, or it increases the flow rate through already activated spray heads 24. Both the number of spray heads and flow rates through each spray head are variable, so the cooling capabilities of the system are continuously variable over a wide range of total flow rates through the device.

To accommodate this optimum cooling, the temperature sensors 14, 16 should be arranged so that one sensor is on one side of the cooling head assembly 10 and the other temperature sensor is on the other side of the cooling head assembly, whereby one temperature sensor can sense the temperature prior to cooling and the other temperature sensor can sense the temperature post-cooling.

The cooling head assembly 10 can also be provided with some means for aspirating the coolant vapor resulting from the spray heads 24. FIG. 2 shows how a suction device 52 can extract the heated and vaporized fluid through duct 54. Arrows are used to indicate the flow of the vapor into the suction device 52 which may be a conventional suction device such as a wet vacuum.

Figure 3:
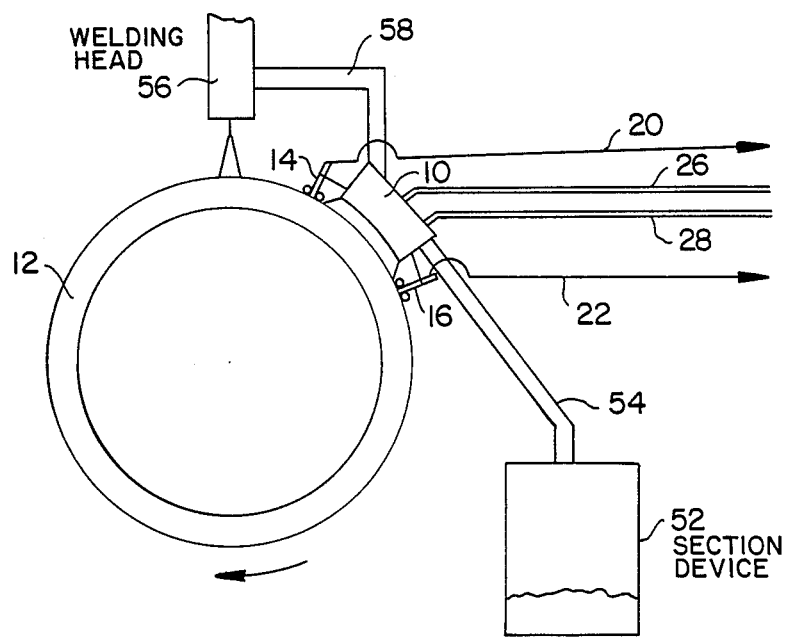
FIG. 3 is a cross-sectional schematic illustration of an embodiment of the present invention in place on an axially symmetrical shape melted workpiece.

During shape melting of an axially symmetrical component or workpiece 12, the cooling head assembly 10 is mounted so it cools the workpiece 12 at a position approximately 30°-45° in the direction of rotation from the welding head 56, as is illustrated in FIG. 3. An arm 58 connects the cooling head assembly 10 with the welding head 56 thereby providing a means for translating the cooling head assembly 10 about the workpiece 12. It is readily apparent that other suitable means would include any type of remote control arm that could move the cooling head assembly 10 about the workpiece. Temperature is sensed in the vicinity of the welding head 56 by temperature sensor 14 and at one other position by temperature sensor 16 to generate the coolant flow and gas flow rate control signals. The cooling head assembly 10 is rigidly fixed to the welding head support system 56 so that the device translates with the head as material is deposited, and the relative positions of the welding head and cooling head assembly can be maintained constant. From FIG. 3, it is readily apparent that other embodiments are possible without departing from the gist or nature of the present invention.

Attached hereto as an Appendix is a list of the control system programming steps used to control the cooling device for the shape melting program. It is written in language "C" which is used for a computer or microprocessor control system such as an IBM PC for example. Any programmable language which can control the cooling device in this fashion is usable.

The present invention generates the following advantages over the prior art:
1. Accurate sensing and control of the temperature of the shape melting component.
2. Control weld cooling continuously and automatically without subjecting the weld deposit to excessive moisture or other deleterious conditions.
3. Optimize the quality of the shape melted component with respect to: distortion, lack of defects and mechanical properties.
4. Apply equally as well to weld cladding operations.

While a specific embodiment of the invention has been shown and described in detail to illustrate the application of principles of the invention, certain modifications and improvements will occur to those skilled in the art upon reading the foregoing description. It is thus understood that all such modification and improvements have been deleted for the sake of conciseness and readability but are properly within the scope of the following claims.

As an example of one such modification, the present invention would work equally well with two or more cooling head assemblies.

We claim:

1. An apparatus for automatically cooling a workpiece being manufactured by shape melting, comprising:
    at least one spray head directed externally at the workpiece, each spray head being supplied with a coolant and a gas;
    at least one housing covering at least one spray head for facilitating the removal of coolant vapor;
    at least two temperature sensors for sensing the external temperature of the workpiece and establishing control signals indicative of same, one of said sensors being situated to sense the temperature or the workpiece before cooling, the other sensor being situated to sense the temperature of the workpiece after cooling;
    means for aspirating coolant vapor from each housing;
    means for regulating the supply of coolant and gas to each spray head responsive to the signals of said temperature sensors; and
    means for translating each housing about the workpiece.

2. An apparatus as defined in claim 1, wherein said housing includes a plurality of spray heads.

3. An apparatus as defined in claim 2, wherein the apparatus has a plurality of housings, each of said housings having a plurality of spray heads.

4. An apparatus as defined in claim 1, wherein said temperature sensors are sliding contact thermocouples.

5. An apparatus as defined in claim 1, wherein said translating means includes an attachment from said housing to a welding head which deposits molten weld material.

6. An apparatus as defined in claim 1, wherein said housing is at approximately 30° to 45° in the direction of rotation from the welding head when building an axially symmetrical workpiece.

7. An apparatus as defined in claim 1, wherein said regulating means includes a computer controlling control valves.

8. A method for automatically cooling a workpiece being manufactured by shape melting, comprising the steps of:
    spraying a coolant with at least one spray head externally on the workpiece with at least one housing covering at least one spray head;
    blowing a gas through each spray head externally on the workpiece;
    supplying coolant and gas to each spray head;
    aspirating coolant vapor from each housing;
    sensing the temperature of the external periphery of the workpiece before cooling the workpiece and then after cooling the workpiece;
    establishing control signals indicative of the temperatures;
    controlling the rate of the coolant and gas supply with a controlling means responsive to the temperature signals; and
    translating each housing about the workpiece.

* * * * *